(12) United States Patent
Matsuo

(10) Patent No.: US 6,546,332 B2
(45) Date of Patent: Apr. 8, 2003

(54) VEHICLE-MOUNTED NAVIGATION APPARATUS

(75) Inventor: Toshiyuki Matsuo, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/987,148

(22) Filed: Nov. 13, 2001

(65) Prior Publication Data

US 2002/0193939 A1 Dec. 19, 2002

(30) Foreign Application Priority Data

Jun. 15, 2001 (JP) ........................................ 2001-182177

(51) Int. Cl.$^7$ .............................................. G01C 21/26
(52) U.S. Cl. ........................ 701/200; 701/25; 701/208; 340/990
(58) Field of Search .......................... 701/25, 35, 200, 701/211, 208, 212; 340/988, 990

(56) References Cited

U.S. PATENT DOCUMENTS 6,006,161 A * 12/1999 Katou ........................ 701/212
6,249,720 B1 * 6/2001 Kubota et al. ................. 701/1
6,401,029 B1 * 6/2002 Kubota et al. ............... 701/201

FOREIGN PATENT DOCUMENTS

| JP | 402002440 A | * | 1/1990 |
| JP | 404299425 A | * | 10/1992 |
| JP | A9-96530 | | 4/1997 |
| JP | A11-53271 | | 2/1999 |
| JP | A2000-241171 | | 9/2000 |
| JP | 2001043207 A | * | 1/2001 |

* cited by examiner

*Primary Examiner*—Gertrude Arthur
(74) *Attorney, Agent, or Firm*—Birch, Stewart, Kolasch & Birch, LLP

(57) ABSTRACT

A vehicle-mounted navigation apparatus comprises a first memory for storing a navigation program, and a second memory that is rewritable, for storing a program other than the navigation program so as to enable the program stored therein to be executed without deleting the navigation program stored in the first memory. The vehicle-mounted navigation apparatus can further comprise a third memory for storing one or more programs other than the navigation program and a main loader. The main loader can load any one of the one or more programs stored in the third memory into the second memory so that they can be made to run on the vehicle-mounted navigation apparatus.

12 Claims, 3 Drawing Sheets

VEHICLE-MOUNTED NAVIGATION APPARATUS

BACKGROUND OF THE INVENTION

1. Field of the Invention

The present invention relates to a vehicle-mounted navigation apparatus that displays the current position of a vehicle, in which the apparatus is mounted, on an on-screen map so as to enable the driver to navigate along a guided route. More particularly, it relates to a vehicle-mounted navigation apparatus capable of using functions other than navigation functions by loading a program other than a navigation program into a memory and executing it without deleting the navigation program.

2. Description of the Prior Art

In general, a vehicle-mounted navigation apparatus, which displays the current position of a vehicle, in which the apparatus is mounted, on an on-screen map so as to enable the driver to navigate along a guided route, comprises a CD-ROM for storing map data, a flash memory for storing a navigation program (i.e., CPU program), and a DRAM or the like disposed as a work area for storing map data, program variables, and so on. In the prior art vehicle-mounted navigation apparatus, program loading is carried out in order to update the navigation program, and by transferring a program for program rewriting to a memory other than the flash memory, i.e., the DRAM, the navigation program stored in the flash memory can be rewritten. Furthermore, the navigation program is loaded into the DRAM and is then made to run.

Furthermore, in the prior art vehicle-mounted navigation apparatus, a navigation apparatus user's manual is offered in printed pamphlet form, or is offered, as help facilities, by a user's manual providing function of the navigation program. While the printed pamphlet cannot provide an explanation for the navigation apparatus using video, voice, etc., the user's manual providing function can provide an explanation for the navigation apparatus using video, voice, etc. and is effective in making the user easier to learn how to use the navigation apparatus.

A problem with a prior art vehicle-mounted navigation apparatus constructed as mentioned above is that since in order to update the navigation program, the previous version of the navigation program stored in the flash memory or the DRAM is rewritten with a new version, the previous version of the navigation program has to be loaded into the flash memory again so as to make the navigation program stored prior to the rewriting run again, and it is therefore necessary to load the previous version of the navigation program into the flash memory or the DRAM again after the execution of the loaded new program is ended.

Furthermore, another problem is that when the navigation program includes a navigation apparatus user's manual providing function, since it is necessary to reduce the size of the user's manual providing function because of the capacity of the flash memory, the memory size used for video, voice, etc. is limited and therefore the user's manual providing function cannot have enough information. Other programs, such as a program for checking the navigation apparatus, a program for conducting a demonstration of the navigation apparatus, a program for enabling the navigation apparatus to be used as a game machine, a program for enabling users to make use of the Internet, etc., suffer from the same drawback.

SUMMARY OF THE INVENTION

The present invention is proposed to solve the above-mentioned problems, and it is therefore an object of the present invention to provide a vehicle-mounted navigation apparatus capable of, by loading a program other than a navigation program into a memory without deleting the navigation program and starting the loaded program, preventing the navigation program from being loaded into the memory again.

It is another object of the present invention to provide a vehicle-mounted navigation apparatus capable of using functions other than navigation functions with efficiency.

In accordance with an aspect of the present invention, there is provided a vehicle-mounted navigation apparatus comprising: a first memory for storing a navigation program; and a second memory that is rewritable, for storing a program other than the navigation program so as to enable the program stored therein to be executed without deleting the navigation program stored in the first memory. According, since the navigation program is not destroyed even though another program is loaded into the navigation apparatus and therefore it is not necessary to load the navigation program again after the loaded program is ended, the aspect of the present invention offers advantages of being able to eliminate re-loading of the navigation program and to use the navigation apparatus for purposes other than originally intended.

In accordance with a preferred embodiment of the present invention, the vehicle-mounted navigation apparatus further comprises a third memory for storing one or more programs other than the navigation program and a main loader, and one of the one or more programs stored in the third memory is loaded into the second memory and is made to run by using the main loader. Accordingly, the program to be loaded can have a large capacity.

The one or more programs can include a program for providing a navigation apparatus user's manual including voice and images. Accordingly, by loading the navigation apparatus user's manual providing program into the second memory, the navigation apparatus can provide an easy-understand explanation of the user's manual including images, moving images, and voice for the user even though the navigation program does not include such a navigation apparatus user's manual providing program. In addition, the navigation apparatus user's manual providing program can provide the latest version of navigation apparatus user's manual for the user. The navigation apparatus user's manual providing program can also add a function of providing a navigation apparatus user's manual to any model of navigation apparatus without such a function.

The one or more programs can include a program for checking the navigation apparatus. Accordingly, by loading the checking program into the second memory, the navigation apparatus can check itself even though the navigation program does not include such a checking program. In addition, the checking program can check the navigation apparatus with the latest version of its checking function. The checking program can also add a function of checking the navigation apparatus to any model of navigation apparatus without such a function.

The one or more programs can include a program for performing a demonstration of the navigation apparatus. Accordingly, by loading the demonstration program into the second memory, the navigation apparatus can conduct a demonstration of itself even though the navigation program does not include such a checking program. In addition, the demonstration program can conduct a demonstration of the navigation apparatus with the latest version of its demonstration function. The demonstration program can also add a function of conducting a demonstration of the navigation apparatus to any model of navigation apparatus without such a function.

The one or more programs can include a game program for enabling the navigation apparatus to be used as a game machine. Accordingly, by loading the game program into the second memory, the user is allowed to use the navigation apparatus as a game machine.

The one or more programs can include a program for enabling users to make use of the Internet. Accordingly, by loading the Internet program into the second memory, the user is allowed to use the navigation apparatus to make use of and access the Internet.

Further objects and advantages of the present invention will be apparent from the following description of the preferred embodiments of the invention as illustrated in the accompanying drawings.

DETAILED DESCRIPTION OF THE PREFERRED EMBODIMENT

Figure 1:
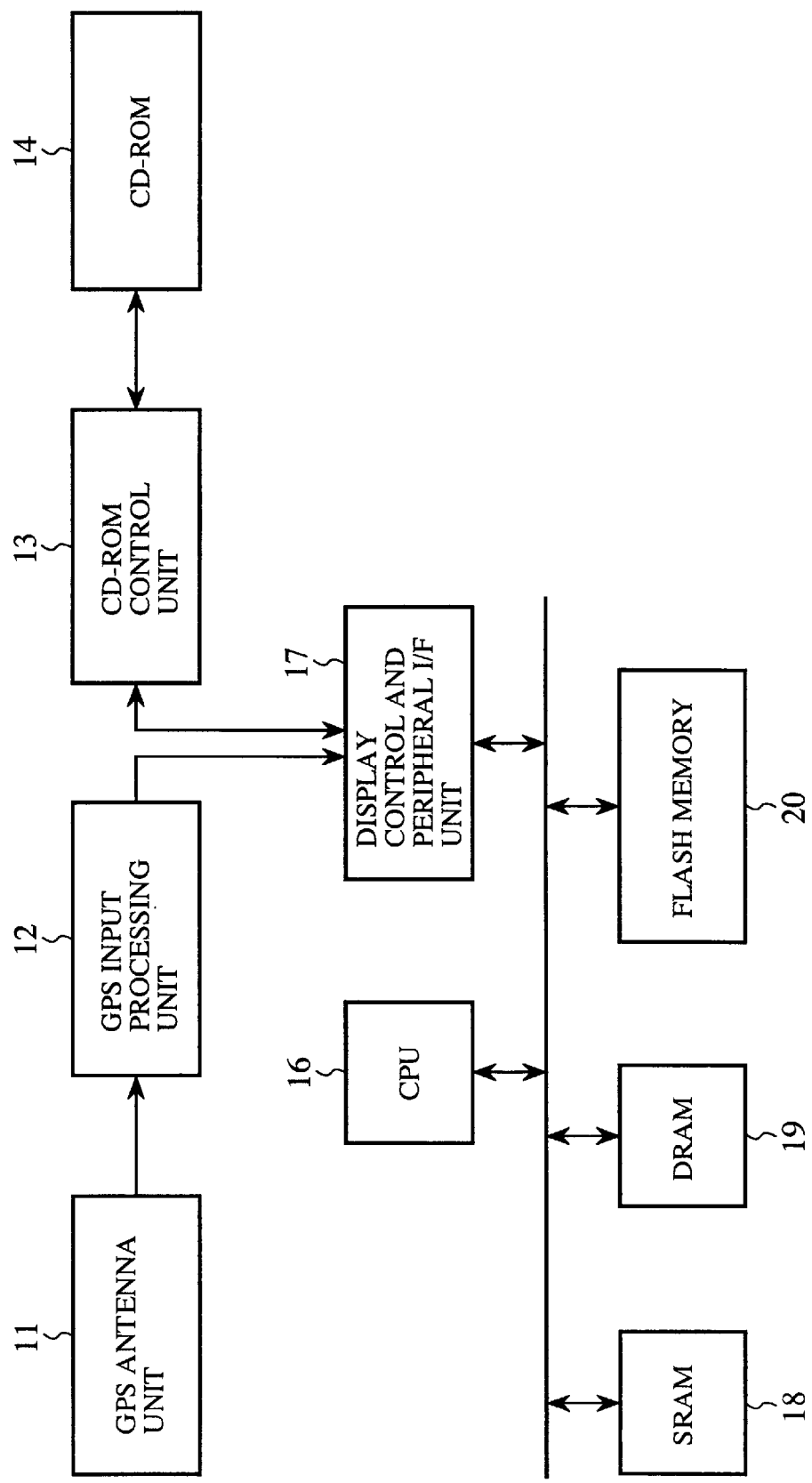
FIG. 1 is a block diagram showing the structure of a vehicle-mounted navigation apparatus according to an embodiment of the present invention.

FIG. 1 is a block diagram showing the structure of a vehicle-mounted navigation apparatus according to an embodiment of the present invention. In FIG. 1, reference numeral 11 denotes a GPS antenna, reference numeral 12 denotes a GPS input processing unit, reference numeral 13 denotes a CD-ROM control unit, reference numeral 14 denotes a CD-ROM, reference numeral 16 denotes a CPU, reference numeral 17 denotes a display control and peripheral I/F unit, reference numeral 18 denotes an SRAM, reference numeral 19 denotes a DRAM, and reference numeral 20 denotes a flash memory.

Figure 2:
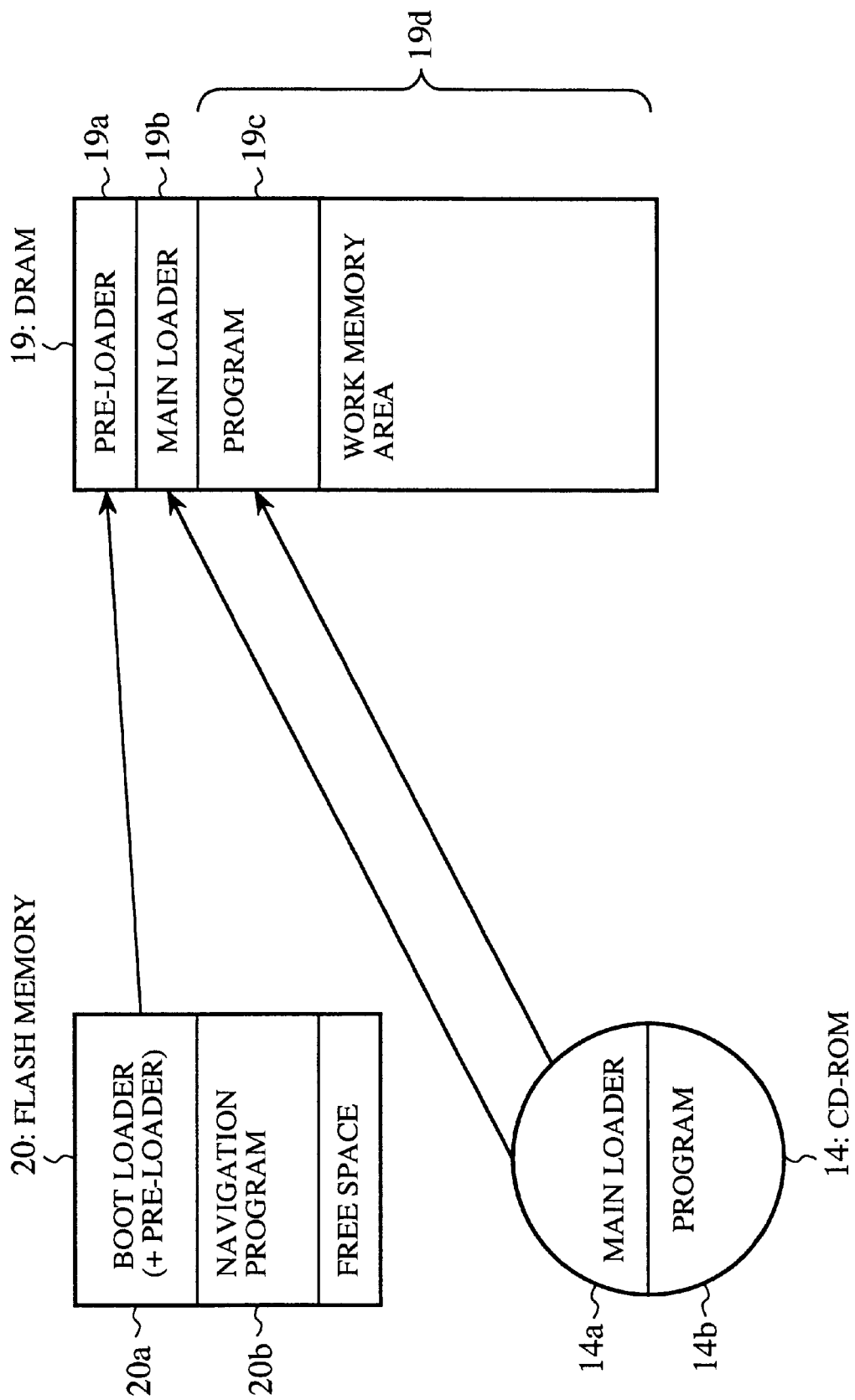
FIG. 2 is a diagram showing the structure of a CD-ROM, a DRAM, and a flash memory included in the vehicle-mounted navigation apparatus of the embodiment of the present invention.

FIG. 2 shows details of the CD-ROM 14, the DRAM 19, and the flash memory 20. A boot loader 20a including a pre-loader and a navigation program 20b are stored in the flash memory 20. A main loader 14a and a set of one or more programs 14b (for example, a user's manual program for providing a navigation apparatus user's manual, a checking program for checking the navigation apparatus, a demonstration program for conducting a demonstration of the navigation apparatus, a game program for enabling the navigation apparatus to be used as a game machine, a program for enabling users to make use of the Internet, a program for navigation, etc.) other than the navigation program are stored in the CD-ROM 14. Map data which the navigation program uses can be also stored in the CD-ROM 14 if necessary. The CD-ROM 14 can be made to run on multiple models of existing navigation apparatuses by storing one or more programs and a main loader provided for each model of navigation apparatus in the CD-ROM so that a different identifier is assigned to each set of both one or more programs and a main loader provided for each model of navigation apparatus. The map data can be stored in a DVD-ROM, a hard disk, or the like instead of the CD-ROM 14.

Any program included in the program set 14b can be started on the DRAM 19. The use of a work memory area 19d in the DRAM 19 enables one program included in the program set 14b other than the navigation program 20b to be started and made to run without deleting (or destroying) the navigation program stored in the flash memory 20. Furthermore, a plurality of different sets of one or more programs 14b are created so that they can run on different models of existing navigation apparatuses, respectively.

The main loader 14a is constructed so as to load one program from the CD-ROM 14. In other words, the main loader can load one program included in the program set 14b into the DRAM 19. The main loader 14a has a function of selecting one program to be loaded into the DRAM from the CD-ROM 14 when a plurality of programs exist in the CD-ROM. A plurality of different types of main loaders 14a are created so that they can run on different models of existing navigation apparatuses, respectively.

In general, the boot loader and pre-loader of an existing model of navigation apparatus are loaders for loading a corresponding main loader stored in the CD-ROM into the DRAM. They also include a function of upgrading the navigation program. By setting the identifier of the corresponding main loader to the one assigned to the existing model of navigation apparatus and adding upgrade information indicating an upgrade to the CD-ROM, the corresponding main loader can be loaded into the existing model of navigation apparatus. In other words, the navigation program checks the identifier and the upgrade information, and then determines whether the corresponding main loader should be loaded into the navigation apparatus. Thus, by modifying each type of main loader according to a corresponding model of navigation apparatus into which each type of main loader is to be loaded and according to a corresponding program to be loaded into the navigation apparatus by the main loader, any program can be loaded into and can be made to run on any existing model of navigation apparatus. As previously explained, by changing the identifier of a main loader and a set of one or more programs stored in the CD-ROM to the one assigned to an existing model of navigation apparatus, any one of the one or more programs can be made to run on the work memory area 19d of the DRAM of the existing model of navigation apparatus without having to change the navigation program, the boot loader, and the pre-loader of the existing model of navigation apparatus.

According to the embodiment of the present invention, the navigation program is created in consideration of a program which is to be loaded into and started on the work memory area 19d of the DRAM 19. In other words, the navigation program 20b is constructed so as to, during the execution thereof, select a program to be loaded into the DRAM from a menu screen, load the selected program into the work memory area 19d of the DRAM 19, and start it. When a program is loaded into the work memory area 19d, the navigation program 20b is not started or only minimum functions of the navigation program 20b continue to be activated. For example, only functions (locator function, voice guidance function, etc.) that do not need any display continue to be activated and a loaded program is allowed to use the display screen.

In this case, it is necessary to allocate a work memory area for locator data and voice guidance. The memory size to be allocated depends on a memory size which the loaded program uses. The loaded program is allowed to have a memory size required for the program to run, and the navigation program confirms an empty size of the work memory area 19*d* of the DRAM 19 and determines which one or more functions can continue to be operated.

Upgrading of the navigation program, intended for an existing navigation apparatus in consideration of the above-mentioned fact that an empty area of the work memory area 19*d* can be assigned to a part of navigation functions that can continue to be operated after loading a program into the work memory area, enables a part of the navigation functions to work while making the loaded program start and run on the work memory area.

The user's manual providing program included in the program set 14*b* can provide an explanation of the navigation apparatus user's manual by using a display unit, a voice output unit, and a manual operating unit of the navigation apparatus in the following. The user's manual providing program can also provide an explanation of functions of all vehicle-mounted equipment (vehicle, audio, etc.).

1) The user's manual providing program can make an explanation of each of display screens, each of screen transitions, an operating guide of each display screen, etc. by using video, animation, and voice.
2) The user's manual providing program can make the same explanation in text. The user's manual providing program can search for a text written for explaining each topic, such as a term or a question.
3) The user's manual providing program can provide user's manuals written in multiple languages, and can also change a language among them. The user's manual providing program can set a language which the navigation program uses to a default language in synchronization with the navigation program.
4) The user's manual providing program can load video, animation, voice, etc. stored in the CD-ROM into the DRAM if necessary in order to use them when the program size is large.

The checking program checks the navigation functions of the navigation apparatus by using the display unit, the voice output unit, and the manual operating unit of the navigation apparatus in the following.

1) The checking program enables the navigation apparatus to check functions related to display, functions related to memories, functions related to communications, functions related to ICs, etc. while showing points to check and a checking procedure by using video, animation, and voice.
2) The checking program displays checking results on the screen of the display unit. They are also transferred to an outside checking machine by using serial communications or the like.

The demonstration program operates a demonstration function by using the display unit, the voice output unit, and the manual operating unit of the navigation apparatus in the following.

1) The demonstration program makes an explanation of the navigation apparatus and a guide to operations of the navigation apparatus by using video, animation, and voice.
2) The demonstration program performs a demonstration by displaying a moving image showing a simulation of travel using the navigation apparatus.
3) When the navigation program is started immediately after the demonstration program is ended, the navigation program further performs a demonstration that enables the user to actually use the navigation apparatus.

The game program operates a game function by using the display unit, the voice output unit, and the manual operating unit of the navigation apparatus in the following.

1) A backup memory for games, such as an SRAM or an EEPROM used for navigation, is provided and the game program is made to enable the user to continue to play the game by reloading the game program into the DRAM after switching off through on the engine.
2) The navigation apparatus uses the backup memory to back up the contents of the work memory area 19*d* into which the game program is loaded so as to enable the user to continue to play the game after switching off through on the engine. The navigation apparatus allows the user to selectively make either the navigation program or the game program start when the engine is switched on.

The Internet program for enabling users to make use of the Internet operates an Internet function by using the display unit, the voice output unit, and the manual operating unit of the navigation apparatus in the following.

1) A backup memory for the Internet, such as an SRAM or an EEPROM used for navigation, is provided and the Internet program is made to enable the user to continue to make use of the Internet by reloading the Internet program into the DRAM after switching off through on the engine.
2) The navigation apparatus uses the backup memory to back up the contents of the work memory area 19*d* into which the Internet program is loaded so as to enable the user to continue to make use of the Internet after switching off through on the engine. The navigation apparatus allows the user to selectively make either the navigation program or the Internet program start when the engine is switched on.

Figure 3:
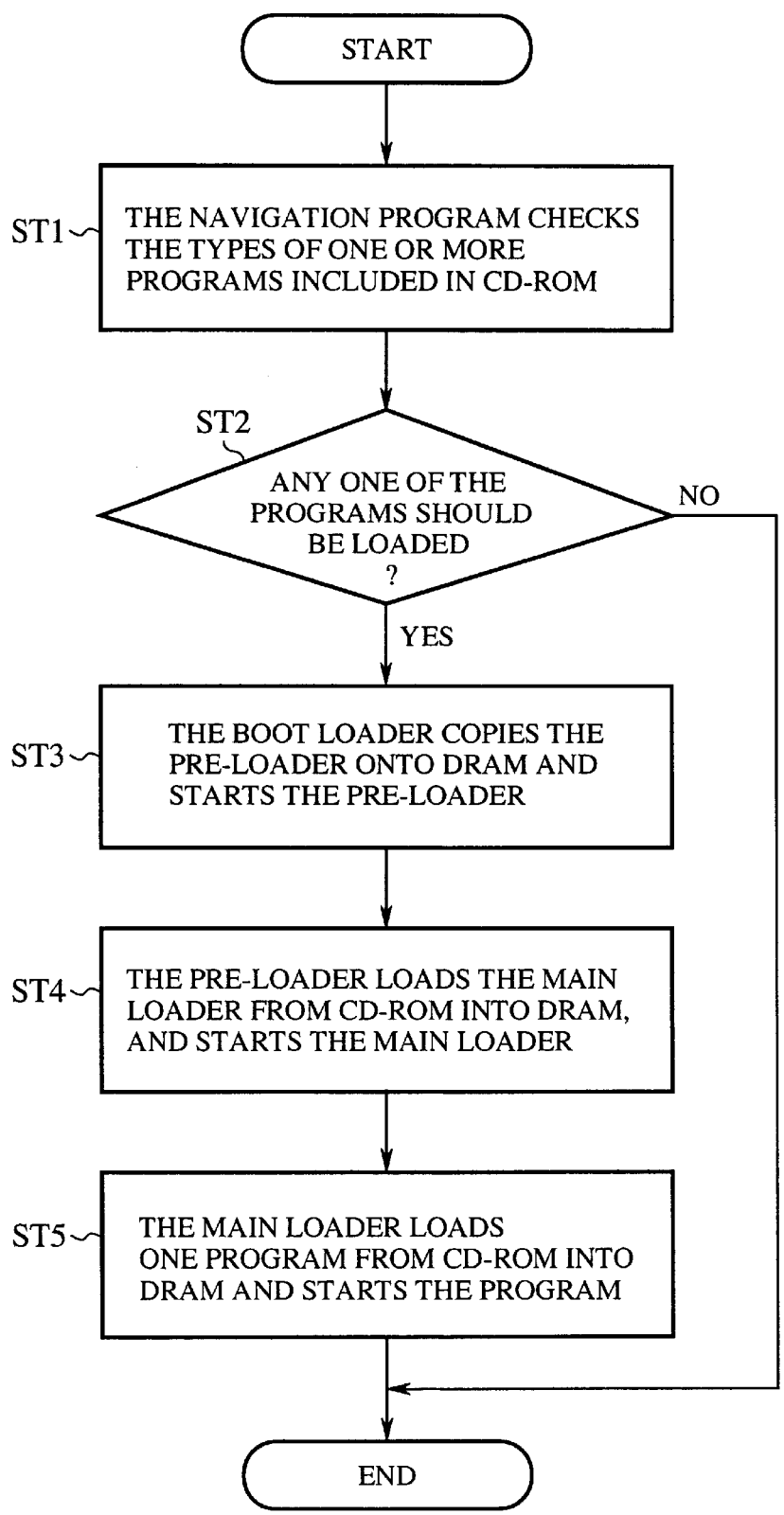
FIG. 3 is a flow chart showing the operation of the vehicle-mounted navigation apparatus of the embodiment of the present invention.

FIG. 3 is a flow chart showing the operation of the vehicle-mounted navigation apparatus of the present invention. Hereafter, the operation of the vehicle-mounted navigation apparatus is explained with reference to FIG. 3. When the power supply is turned on and the CD-ROM 14 is inserted into the navigation apparatus, the navigation apparatus, in step ST1, checks which types of one or more programs, i.e., a program for user's manual explanation, a checking program, a demonstration program, a game program, an Internet program, and a program for navigation, the CD-ROM 14 includes. The navigation apparatus then, in step ST2, determines whether any one of one or more programs included in the CD-ROM should be loaded automatically or according to the user's operation. In this case, when the CD-ROM 14 includes only a program, the navigation apparatus automatically and immediately loads the program into the DRAM or displays a menu for allowing the user to determine whether or not to load the program according to the user's operation. When the CD-ROM 14 includes a plurality of types of programs, the navigation apparatus automatically and immediately loads the main loader into the DRAM, and the main loader displays a menu for allowing the user to determine which one of the plurality of types of programs is to be loaded into the. DRAM 19 according to the user's operation and loads a selected program into the work memory area 19*d* of the DRAM 19 or display a menu for allowing the user to determine whether or not to load the program according to the user's operation.

When the navigation apparatus determines that any one of one or more programs included in the CD-ROM should not be loaded in step ST2, it ends the loading of programs. In contrast, when the navigation apparatus determines that any one of one or more programs included in the CD-ROM should be loaded, it advances to step ST3 in which the boot loader 20*a* stored in the flash memory 20 copies the pre-loader within the boot loader onto the DRAM 19 and starts the pre-loader 19*a*. The boot loader 20*a* (i.e., pre-loader) is adapted to loading the main loader 14*a* from the CD-ROM 14.

Next, the pre-loader, in step ST4, loads the main loader 14*a* from the CD-ROM 14 into the DRAM 19, and starts the main loader. The main loader 19*b* is adapted to performing different processing for each program. Since the main loader can be loaded from the CD-ROM 14, the main loader can be varied with flexibility according to a program to be loaded and the hardware of the navigation apparatus. When there are two or more programs to be loaded within the CD-ROM, the main loader can display a menu for enabling the user to select one program from among the plurality of programs to be loaded. Furthermore, the user can be allowed to freely determine which memory (flash memory, ROM or DRAM) the selected program is to be loaded into.

The main loader then, in step ST5, loads the selected program from the CD-ROM 14 into the DRAM 19 and starts the program 19*c*. In contrast, when upgrading the navigation program or the like, the main loader writes a new version of the navigation program in the flash memory 20 without starting the navigation program. How the main loader processes the program loaded into the DRAM 19 differs depending on the type of the main loader. The navigation apparatus thus completes the loading and starting of the selected program.

Many widely different embodiments of the present invention may be constructed without departing from the spirit and scope of the present invention. It should be understood that the present invention is not limited to the specific embodiments described in the specification, except as defined in the appended claims.

What is claimed is:

1. A vehicle-mounted navigation apparatus comprising:

a first memory for storing a navigation program;

a rewritable second memory for receiving the navigation program and at least one non-navigation program, said second memory further having a main loader associated with said non-navigation program storable therein; and a third memory for storing said non navigation program and said main loader; wherein said non-navigation program, stored in said third memory, is loaded directly to and executed in said second memory using said main loader, and wherein said non-navigation program ,and said navigation program are both loaded into said second memory and are able to run simultaneously.

2. The vehicle-mounted navigation apparatus according to claim 1, further comprising a means for loading any one of said non-navigation programs stored in said third memory into said second memory and making it run by using said main loader.

3. The vehicle-mounted navigation apparatus according to claim 2, wherein said non-navigation program includes a program for checking said navigation apparatus.

4. The vehicle-mounted navigation apparatus according to claim 2, wherein said non-navigation program includes a program for performing a demonstration of said navigation apparatus.

5. The vehicle-mounted navigation apparatus according to claim 2, wherein said non-navigation program includes a game program for enabling said, navigation apparatus to be used as a game machine.

6. The vehicle-mounted navigation apparatus according to claim 2, wherein said non-navigation program includes a program for enabling users to make use of the Internet.

7. The vehicle-mounted navigation apparatus according to claim 1, wherein said non-navigation program includes a program for providing a navigation apparatus user's manual including voice and images.

8. The vehicle-mounted navigation apparatus according to claim 2, wherein said non-navigation program includes a program for providing a navigation apparatus user's manual including voice and images.

9. The vehicle-mounted navigation apparatus according to claim 1, wherein said non-navigation program includes a program for checking said navigation apparatus.

10. The vehicle-mounted navigation apparatus according to claim 1, wherein said non-navigation program includes a program for performing a demonstration of said navigation apparatus.

11. The vehicle-mounted navigation apparatus according to claim 1, wherein said non-navigation program includes a game program for enabling said navigation apparatus to be used as a game machine.

12. The vehicle-mounted navigation apparatus according to claim 1, wherein said non-navigation program includes a program for enabling users to make use of the Internet.

\* \* \* \* \*